(12) United States Patent
Fukashiro et al.

(10) Patent No.: US 6,334,009 B1
(45) Date of Patent: *Dec. 25, 2001

(54) OPTICAL SIGNAL SWITCHING APPARATUS

(75) Inventors: Yasuyuki Fukashiro; Shinichi Kuwano; Kenji Yamahara, all of Yokohama; Yukio Hayashi, Fujisawa; Hideaki Tsushima, Komae, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/680,446

(22) Filed: Oct. 6, 2000

Related U.S. Application Data

(63) Continuation of application No. 09/182,441, filed on Oct. 30, 1998, now Pat. No. 6,229,932.

(30) Foreign Application Priority Data

Nov. 26, 1997 (JP) .................................... 9-324140

(51) Int. Cl.[7] ...................................... G02B 6/35
(52) U.S. Cl. ............................................ 385/16
(58) Field of Search ..................... 385/15, 16; 323/324

(56) References Cited

U.S. PATENT DOCUMENTS

| | | | |
|---|---|---|---|
| 4,716,357 | 12/1987 | Cooper | 323/263 |
| 4,909,584 | 3/1990 | Imoto et al. | 350/124 |
| 4,946,233 * | 8/1990 | Seto | 359/212 |
| 5,905,829 | 5/1999 | Maenishi et al. | 385/59 |
| 6,229,932 * | 5/2001 | Fukashiro et al. | 385/16 |

FOREIGN PATENT DOCUMENTS

| | | |
|---|---|---|
| 915543 | 1/1997 | (JP) . |
| 2654437 | 5/1997 | (JP) . |

OTHER PUBLICATIONS

H. Sano, et al, "Photonics in Switching" Technical Digest PTHA5, 1997, pp. 83–87.

* cited by examiner

Primary Examiner—John D. Lee
Assistant Examiner—Sarah N Song
(74) Attorney, Agent, or Firm—Antonelli, Terry, Stout & Kraus, LLP

(57) ABSTRACT

An optical signal switching apparatus that maintains an optical switch to a specified state even when noise is generated during the turning on and/or off of power to an optical switch control unit which controls the optical switch. The optical switch control unit includes an optical switch driving unit, a power supply and a power supply surveillance unit. When a specified condition of the power supply is not satisfied, a control signal is generated by the power supply surveillance unit. Upon detection of the control signal the optical switch driving unit, fixes the state of the optical switch to a previously set state without regard to the input to the optical switch driving unit.

15 Claims, 6 Drawing Sheets

OPTICAL SIGNAL SWITCHING APPARATUS

This is a continuation of application Ser. No. 09/182,441, filed Oct., 30, 1998, now U.S. Pat. No. 6,229,932.

BACKGROUND OF THE INVENTION

The present invention relates to an optical signal switching apparatus using an optical switch that is used with optical communication equipment, etc. More specifically, the present invention relates to an optical signal switching apparatus that suppresses an incorrect action of the optical switch at the time of power on and/or power off.

Following speed-up and capacity increase of information transmission in recent years, an optical fiber network using an optical fiber and various optical devices has been introduced. The range of applications of the optical fiber network extends from the public communication networks to local area networks. An optical signal switching apparatus is one of the equipment used to realize an optical fiber network. An optical signal switching apparatus does not need to convert an optical signal into an electric signal which is switched to various routes, based on the converted electrical signal, in order to perform the switching function. Therefore, the construction of the optical fiber network becomes simple. Thus, the optical signal switching apparatus aids in realizing miniaturization and economization of the network.

There has been proposed for example, an optical cross connection equipment as an optical signal switching apparatus. An optical cross connection equipment is described in the "Photonics In Switching", Technical Digest PTHA5 1997 for example.

The optical signal switching apparatus generally includes an optical switch and an optical switch control unit. The optical switch is the key device of the optical signal switching apparatus. The use of a self holding type optical switch as the optical switch offers advantages due to its low consumption of electric power. The self holding type optical switch is an optical switch that maintain the state of the switch without the use of an electric power supply by using a permanent magnet, etc.

The structure of an optical signal switching apparatus is illustrated in FIG. 1. FIG. 1 illustrates that an optical switch control unit includes an optical switch driving unit and a power supply which supplies electric power to the optical switch driving unit. The optical switch driving unit generates a optical switch driving signal to drive the optical switch when an optical switch switching signal is detected. The optical switch driving unit transmits the optical drive signal to the optical switch. In FIG. 1, the optical inputs and optical outputs that are switched by the optical switch are omitted. A related optical signal switching apparatus is disclosed in Japan patent 2654437.

However the optical switch control unit described above does not take into consideration the noise that is originated in and generated by the turning on and/or off of power by the power supply. Therefore, it is easy for incorrect operation to occur at such times. More specifically, the noise originating in and generated by the tuning on and/or off of power by the power supply can possibly change the state of the optical switch that is being held.

The incorrect operation of the optical switch can result in the of loss not only large amounts of information but also has the possibility of inducing damage and a incorrect operation of other optical devices. For example, in a case where an optical switch is used with respect to a working system and a redundant system for protecting the working system, high reliability of the optical switch is required. It is essential that even when the electric power supply to the optical switch driving unit is interrupted, the optical switch should be maintained to the previously set state.

SUMMARY OF THE INVENTION

It is an object of the present invention to provide an optical signal switching apparatus that can maintain the state of an optical switch to a predetermined state at the time of turning on and/or off the power supply and at the time of output abnormality.

According to the present invention, the purpose of the above can be realized in an optical switch control unit with the following functions. The power state of the power supply of the optical switch control unit is supervised. When a predetermined condition of the output voltage of the power supply is satisfied, the optical switch driving unit is placed in an operation state. When the predetermined condition of the output voltage of the power supply is not satisfied, the optical switch driving unit is placed in a halt state. The operation state is a state where when an optical switch switching signal is input into the optical switch driving unit, an optical switch driving signal according to the optical switch switching signal is generated. The halt state is a state where even if an optical switch switching signal is input into the optical switch driving unit an optical switch driving signal is not generated.

The optical switch control unit includes an optical switch driving unit, a power supply which provides electrical power to the optical switch driving unit and a power supply surveillance unit which monitors the output voltage of the power supply and outputs a control signal to the optical switch driving unit. When the predetermined condition for the output voltage of the power supply is not satisfied, the control signal is generated. Detection of the control signal by the optical switch driving unit places the optical switch driving unit in the halt state.

According to the present invention, the purpose of the above is achieved by having an optical signal control unit and a self holding type optical switch.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which.

DETAILED DESCRIPTION OF THE INVENTION

Figure 1:
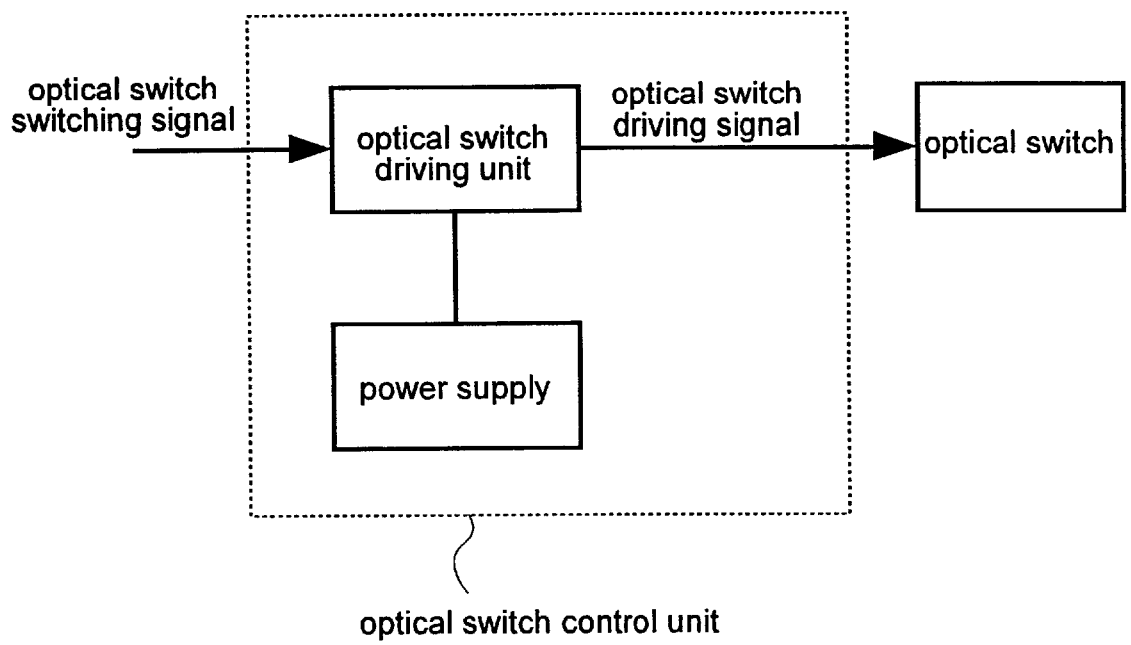
FIG. 1 illustrates a related technique of the optical signal switching apparatus.
Figure 2:
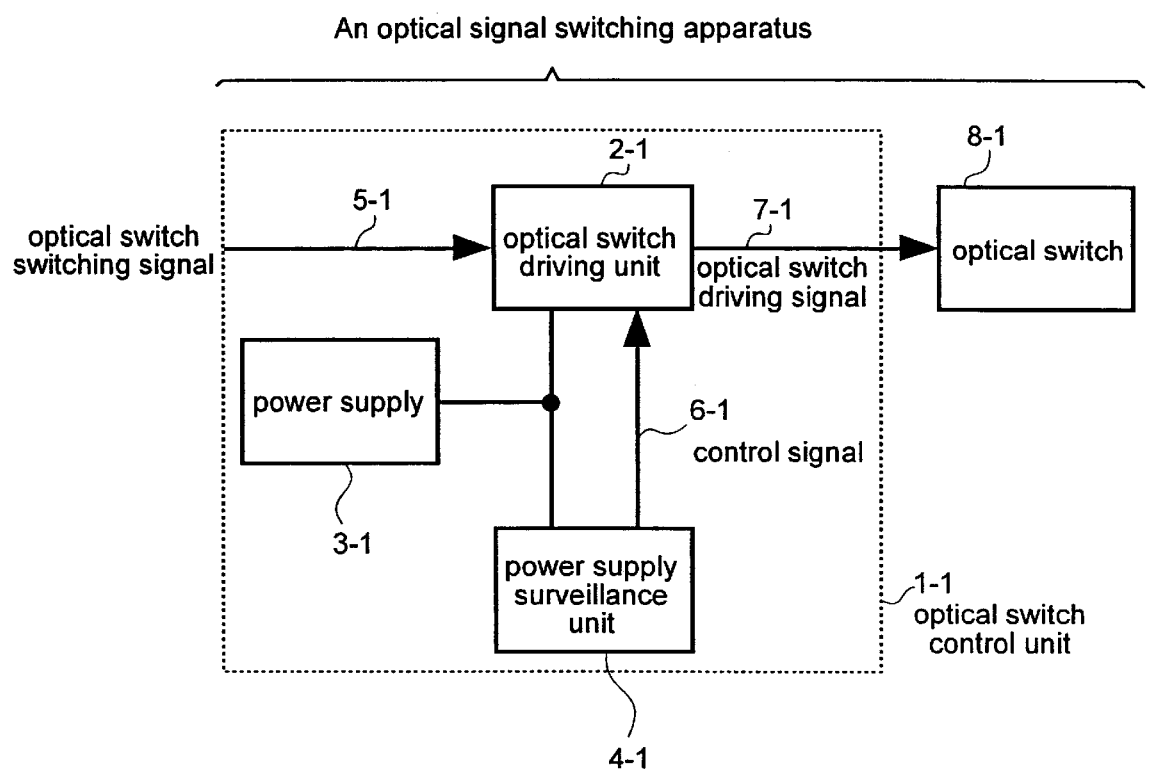
FIG. 2 illustrates a schematic diagram of an embodiment of the optical signal switching apparatus according to the present invention.

As follows, the various figures are referred to, and preferred embodiments are explained. FIG. 2 illustrates a schematic diagram of an embodiment of the optical signal switching apparatus according to the present invention. In FIG. 2, an optical switch control unit 1-1 includes an optical switch driving unit 2-1, a power supply 3-1 which provides electricity to the optical switch driving unit 2-1 and a power supply surveillance unit 4-1 which outputs a control signal 6-1 to optical switch driving unit 2-1 according to the output voltage of the power supply.

As for the power supply surveillance unit 4-1, it is necessary that an operating voltage range of the power supply surveillance unit 4-1 be broader than a operating voltage range of the optical switch driving unit 2-1. In addition, it is essential to output the control signal 6-1 in advance prior to the optical switch driving unit 2-1 entering the operation instability region at the time of power on and/or off for the power supply surveillance unit 4-1. When power supply 3-1 does not satisfy a predetermined condition, and such is detected by the power supply surveillance unit 4-1, the control signal 6-1 generated by the power supply surveillance unit 4-1 places the optical switch driving unit 2-1 in a halt state.

In the optical switch control unit 1-1 of the present invention, the power supply surveillance unit 4-1 supervises power output fluctuation. When the output power of the power supply 3-1 is outside the predetermined power output range, the power supply surveillance unit 4-1 generates the control signal 6-1, and places the optical switch driving unit 2-1 in a halt state. Therefore, even when noise that follows power on and/or off occurs, the state of the optical switch can be maintained to the specified state.

Figure 3A:
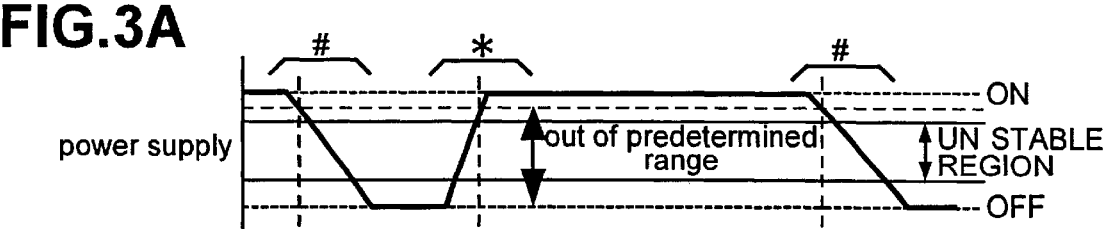
FIGS. 3A–C illustrate state transition diagrams of the elements of the optical switch control unit according to the present invention.
Figure 3B:
Figure 3C:
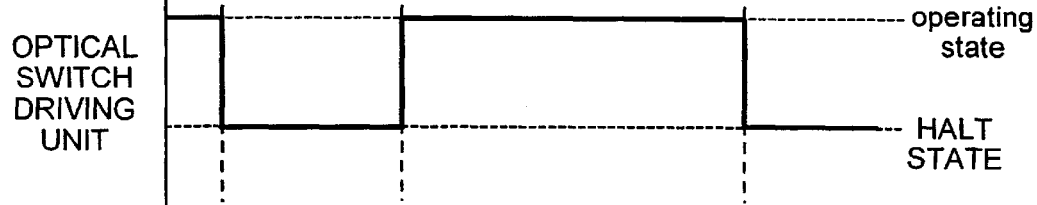

FIGS. 3A–C illustrate state transition diagrams of the elements of the optical switch control unit 1-1 according to the present invention. When electric power is turned off, and the output of the power supply 3-1 is outside of the predetermined range, such is indicated as "#" in FIG. 3A. As illustrated in FIG. 3B, before the power voltage reaches an unstable zone, the control signal 6-1 transitions into the on state. Therefore, as illustrated in FIG. 3C, the optical switch driving unit 2-1 in response to the control signal 6-1, when the control signal 6-1 is in the ON state, transitions into a halt state.

To the contrary, as indicated at "*" in FIG. 3A, when the power supply 3-1 is turned on, the control signal 6-1 output by the power supply surveillance unit 4-1 which has lower operation voltage, is generated first. When output of the power supply 3-1 is within the specified range, the control signal 6-1 changes into an off state. When output of the power supply 3-1 is outside the predetermined range, the control signal 6-1 falls. FIG. 3C illustrates that the optical switch driving unit 2-1, in response to the fall of the control signal 6-1, transitions into an operation state. Wherein the power supply 3-1 is turned off, the control signal 6-1 is also turned off. This is because there is no electric power being supplied to the power supply surveillance unit 4-1 which generates the control signal 6-1. Such is illustrated schematically in FIG. 3B.

Figure 4:
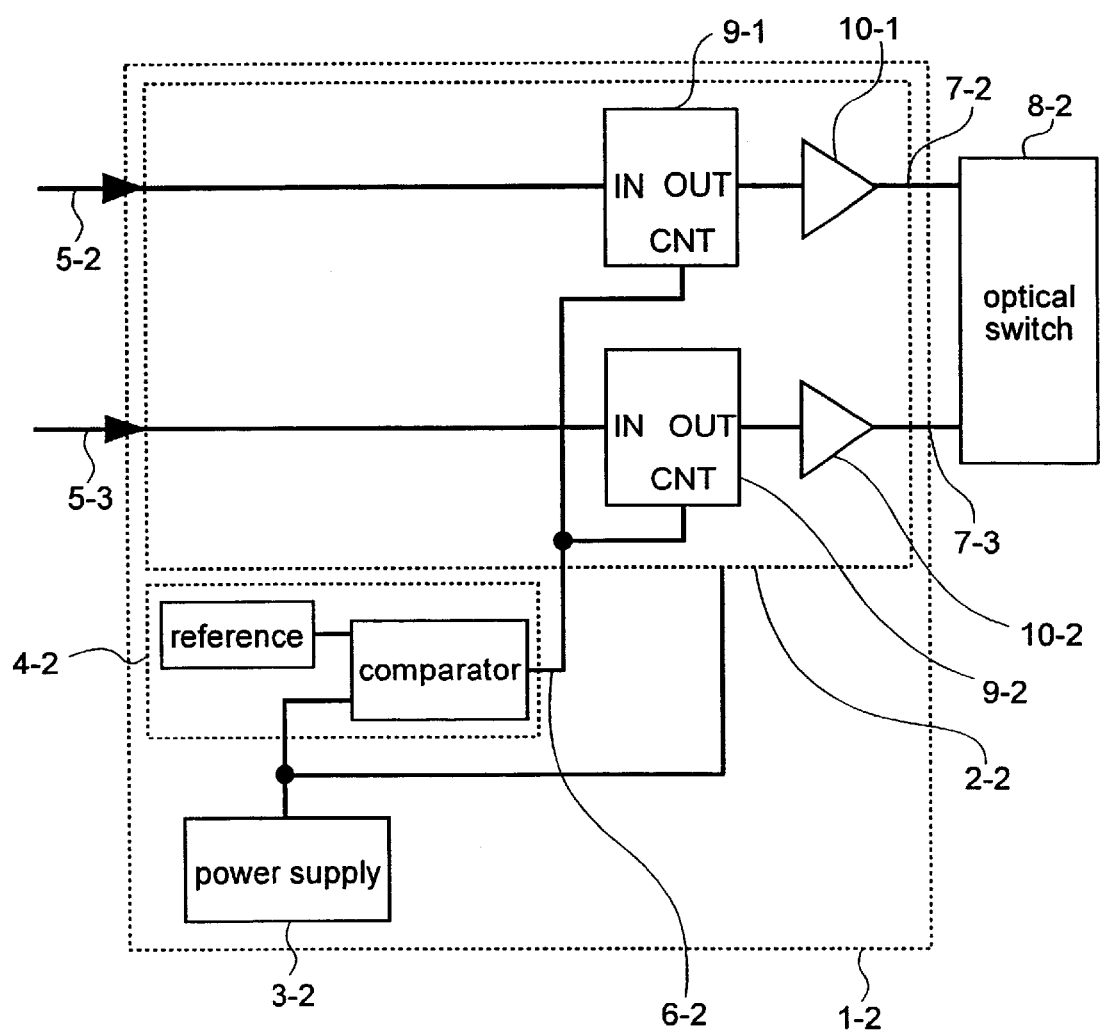
FIGS. 4–6 illustrate schematic diagrams of other embodiments of the optical signal switching apparatus according to the present invention.

FIG. 4 is a schematic diagram illustrating another embodiment of an optical signal switching apparatus according to the present invention. In FIG. 4, the photo switch control unit 1-2 includes an optical switch driving unit 2-2, a power supply 3-2 that supplies electric power to the optical switch driving unit 2-2 and a power supply surveillance unit 4-2. The optical switch driving unit 2-2 includes gate circuits 9-1 and 9-2 and buffer circuits 10-1 and 10-2. The optical switch control unit 1-2 controls the switching of the optical switch 8-2 by sending either an optical switch switching signal 5-2 or an optical switch switching signal 5-3 to the optical switch driving unit 2-2.

The power supply surveillance unit 4-2 compares the output voltage of the power supply 3-2 and a reference voltage by a comparator and outputs a control signal 6-2 as the comparison result. The gate circuits 9-1 and 9-2 are able to select, based on the control signal 6-2, either a normal working state which causes specified signal processing corresponding to an input signal or a halt state which holds a predetermined output irrespective of any input signal.

When the output of power supply 3-2 is outside the predetermined range, the control signal 6-2 of the power supply surveillance unit 4-2 is input into gate circuits 9-1 and 9-2. As a result, the optical switch control unit 2-1 transitions into the halt state, wherein outputs 7-2 and 7-3 are fixed against any input signal. When the output power of the power supply 3-2 is within the predetermined range, the optical switch control unit 2-1 transitions into the normal state, wherein specified processing is performed corresponding to an input signal.

Therefore, as for the photo switch control unit 1-2, when the output power is turned on or off, the output power is outside the predetermined range causing the photo switch control unit 1-2 to transition to the halt state. Therefore, even when noise that occurs following the turning on or off of the output power of the power supply 3-2, the optical switch can maintain the state set previously. Even if the power supply surveillance unit 4-2 is supplied with power from outside or inside of the photo switch control unit 1-2, the unique effect of the present invention is likewise achieved in the same manner.

Figure 5:
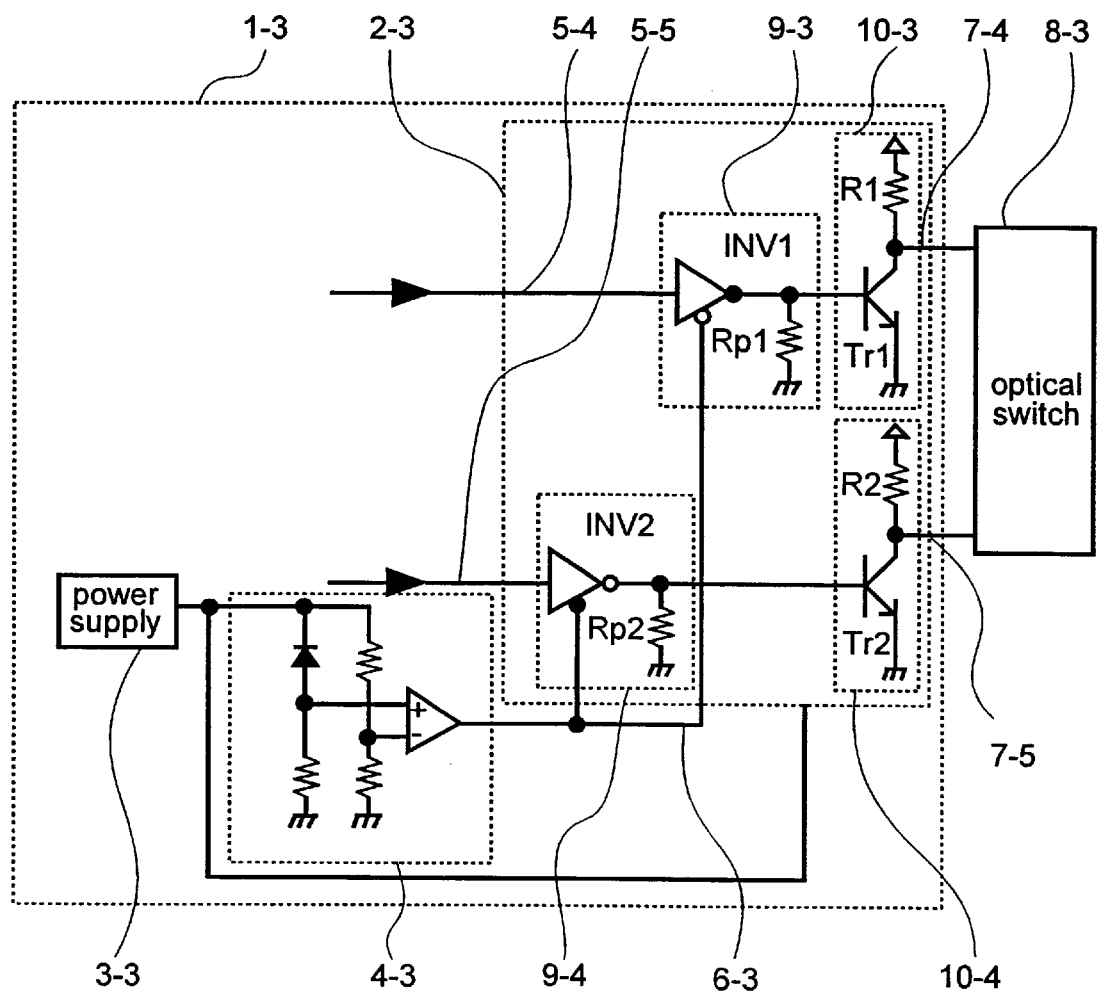

FIG. 5 illustrates another embodiment of an optical signal switching apparatus according to the present invention. Specifically FIG. 5 illustrates the structure of the optical switch control unit of FIGS. 2 and 4.

As per FIG. 5, the optical switch control unit 1-3 performs the switching control of photo switch 8-3 by sending either an optical switch switching signals 5-4 or 5-5 to the optical switch driving unit 2-3. The optical switch driving unit 2-3 includes gate circuits 9-3 and 9-4 which have tri-state invertors INV1 and INV2 and pull down resistors RP1 and RP2, and a buffer circuit which includes resistors R1 and R2 and transistors TR1 and TR2.

In case either optical switch switching signal 5-4 or 5-5 is input into optical switch driving unit 2-3, an electric potential difference is generated in the collector of transistors TR1 and TR2. As for photo switch 8-3, application of this electric potential difference changes its state. The power supply surveillance unit 4-3 generates a standard voltage by a constant voltage diode and a resistor compares the standard voltage and output voltage of the power supply 3-3 by use of a comparator which outputs a comparison result to gate circuits 9-3 and 9-4 as a control signal. The standard voltage is set at the lowest power voltage possible, for example, wherein the optical switch driving unit still operates normally.

According to the present embodiment, output of the power supply surveillance unit 4-3 is input into gate circuits 9-3 and 9-4 of optical switch driving unit 2-3 as control signal 6-3. When the output power from power supply 3-3 is outside of the predetermined range wherein the optical switch driving unit 2-3 can normally operate, output of the tri-state inverters of gate circuits 9-3 and 9-4 transition forcibly to high impedance simultaneously. Thus, the output of gate circuits 9-3 and 9-4 are fixed to the low level simultaneously by pull down resistances RP1 and RP2.

Transistors TR1 and TR2 of buffer circuits 10-3 and 10-4 turn off simultaneously by the fixed low level output of gate circuits 9-3 and 9-4. As a result, the output of buffer circuits 10-3 and 10-4 are fixed to a high level simultaneously.

Therefore, control signal 6-3 places the optical switch driving unit 2-3 in a halt state at the time of power on or off. When the optical switch driving unit 2-3 is placed in the halt state, an electric potential difference is not generated between the collectors of transistors TR1 and TR2. Therefore, the optical switch does not change to a state from that previously set. If the output voltage of the power supply 3-3 exceeds the standard voltage, the outputs of tri-state invertors INV1 and INV2 of gate circuits 9-3 and 9-4 are released from the high impedance state and the specified signal processing corresponding to an input signal is enabled. The standard voltage of the power supply surveillance unit 4-3 can be supplied from outside of optical switch control unit 1-3.

As for the effect of the present invention, it is clear that it is not limited to the circuit illustrated in FIG. 5. Each gate circuit can be composed of 3 state inverters and pull down resistors as illustrated or flip-flops or mono-stable multi-vibrators, etc with the function of reset or presetting. However, use of such elements would still allow the present invention to operate the same.

In the above embodiment, the optical switch control unit includes the power supply. However, even when electric power is supplied from an external power supply, the unique effects of the present invention as described above are still gained.

Figure 6:
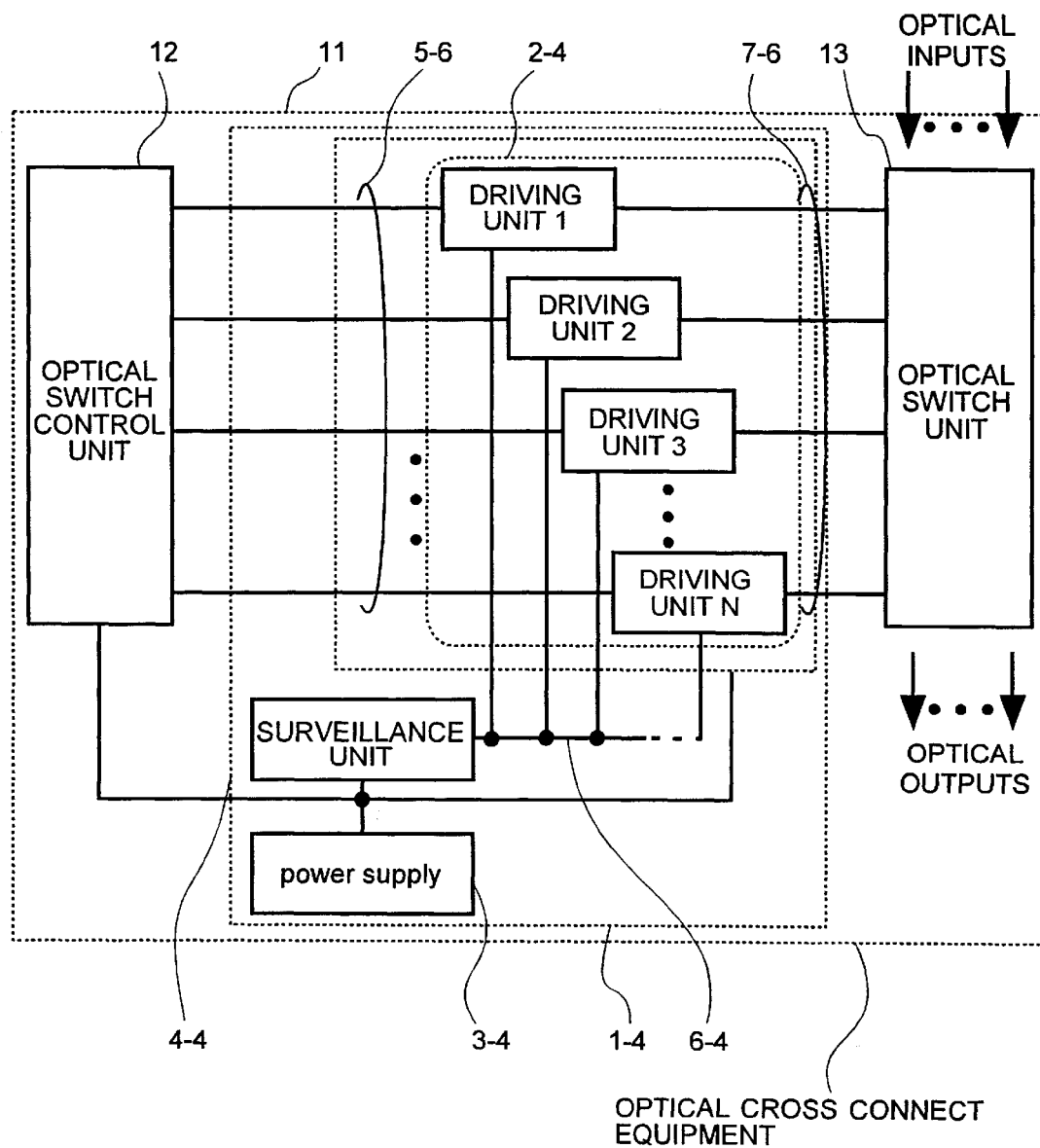

FIG. 6 illustrates another embodiment of an optical signal switching apparatus according to the present invention. A case where an optical switch control unit according to the present invention is applied to optical cross connect equipment is explained.

As per FIG. 6, an optical cross connect equipment 11 includes an optical switch unit 13 which has a plurality of self-holding type optical switches, an optical switch driving unit 2-4 which has a plurality of switch driving units for driving respective optical switches of the optical switch unit 13, a power supply 3-4 which provides electrical power to the optical switch driving unit 2-4, a power supply surveillance unit 4-4 and an optical switch control unit 12 which controls the optical switch unit 13 through the optical switch driving unit 2-4.

The output of power supply 3-4 is supervised in power supply surveillance unit 4-4, and a surveillance signal is sent to all switch driving units of the optical switch driving unit 2-4 as control signal 6-4. When control signal 6-4 indicates that the output of the power supply 3-4 is outside of the predetermined range, the switch driving units of the optical switch driving unit 2-4 are transitioned to a halt state. When control signal 6-4 indicates that the output of power supply 3-4 is within the predetermined range, the switch driving units of the optical switch driving unit 2-4 are transitioned to an operation state.

If the output voltage of the power supply 3-4 is outside of the predetermined range, the power supply surveillance unit places the switch driving units in a halt state in this embodiment. When a switch driving unit is in a halt state, a signal that drives a optical switch is not output even if a photo switch drive circuit becomes unstable, following power on or off. Therefore, the previously set path of the optical signal of the optical switch unit is maintained. The optical switch unit 13 can be composed only of optical switches of a self holding type. For example, a photo switch of a self holding type has only to be used for the part that also wants to maintain an optical signal path at the time of power abnormality.

The present invention is not limited to optical cross connect equipment, and it is possible also to apply the present invention to other optical signal switching devices with optical switches. As for the optical switch to which an optical switch control unit according to the present invention is applied, for example, even a photo switch of 2 outputs and 1 input is acceptable, and even a photo switch of plural outputs and plural inputs is acceptable.

As described above, in the present invention, if the power supply surveillance unit, which is included in the optical control unit which controls the self holding type optical switches, detects that the output voltage is outside of the predetermined range, the power supply surveillance unit places the optical switch driving unit in a halt state. As a result when the noise that follows power on or off occurs, maintaining the state of the optical switch to a previously set is enabled, and an optical signal switching apparatus that is high reliability can be realized.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. An optical signal switch driving apparatus comprising:
   an optical switch driving unit which drives an optical switch;
   a power supply which provides electric power to the optical switch driving unit; and
   a power supply surveillance unit which monitors output voltage of the power supply and provides a control signal to said optical switch driving unit based on the output voltage of the power supply to control operation of said optical switch driving unit.

2. An optical signal switching apparatus according to claim 1, wherein said optical switch driving unit comprises:
   a gate circuit, responsive to said control signal, which selects between an operation state which allows processes to be performed corresponding to an input signal and a halt state which fixes an output of said optical switch corresponding to any input signal.

3. An optical signal switching apparatus according to claim 1, wherein when the output voltage of said power supply is outside of a predetermined range, said power supply surveillance unit outputs a control signal which fixes an output of said optical switch driving unit independent of an input to said optical switch driving unit.

4. An optical signal switching apparatus according to claim 2, wherein when the output voltage of said power supply is outside of a predetermined range, said power supply surveillance unit outputs a control signal which fixes an output of said optical switch driving unit independent of an input to said optical switch driving unit.

5. An optical signal switching apparatus according to claim 1, wherein when said power supply starts supplying electric power, said power supply surveillance unit outputs a control signal which fixes an output of said optical switch driving unit independent of an input of said optical switch driving unit.

6. An optical signal switching apparatus according to claim 2, wherein when said power supply starts supplying electric power, said power supply surveillance unit outputs a control signal which fixes an output of said optical switch driving unit independent of an input of said optical switch driving unit.

7. An optical signal switching apparatus according to claim 1, wherein said optical switch is a self holding type.

8. An optical signal switching apparatus according to claim 2, wherein said optical switch is a self holding type.

9. In an optical signal switch driving apparatus including an optical switch driving unit which drives an optical switch, and a power supply which provides electric power to the optical switch driving unit, a method of controlling operation of said optical switch driving unit comprising:

monitoring output voltage of said power supply; and providing a control signal to said optical switch driving unit based on the output voltage of the power supply to control operation of said optical switch driving unit.

10. A method according to claim 9, further comprising:

responsive to said control signal, selecting between an operation state which allows processes to be performed corresponding to an input signal and a halt state which fixes an output of said optical switch corresponding to any input signal.

11. A method according to claim 9, further comprising:

when the output voltage of said power supply is outside of a predetermined range, fixing by said control signal an output of said optical switch driving unit independent of an input to said optical switch driving unit.

12. A method according to claim 9, further comprising:

when said power supply starts supplying electric power, fixing by said control signal an output of said optical switch driving unit independent of an input of said optical switch driving unit.

13. A method according to claim 10, further comprising:

when said power supply starts supplying electric power, fixing by said control signal an output of said optical switch driving unit independent of an input of said optical switch driving unit.

14. A method according to claim 9, wherein said optical switch is a self holding type.

15. A method according to claim 10, wherein said optical switch is a self holding type.

* * * * *